(12) United States Patent
Ueda et al.

(10) Patent No.: US 8,723,942 B2
(45) Date of Patent: May 13, 2014

(54) PHOTOMICROSCOPY SYSTEM, IMAGE INPUT DEVICE, AND AUTOMATIC EXPOSURE METHOD

(75) Inventors: Hitoshi Ueda, Tokyo (JP); Takashi Yoneyama, Sagamihara (JP); Yasuko Ishii, Tokyo (JP)

(73) Assignee: Olympus Corporation, Tokyo (JP)

( * ) Notice: Subject to any disclaimer, the term of this patent is extended or adjusted under 35 U.S.C. 154(b) by 533 days.

(21) Appl. No.: 12/651,678

(22) Filed: Jan. 4, 2010

(65) Prior Publication Data

US 2010/0214403 A1    Aug. 26, 2010

(30) Foreign Application Priority Data

Jan. 8, 2009    (JP) ................. 2009-002895

(51) Int. Cl.
*H04N 7/18* (2006.01)
(52) U.S. Cl.
USPC .......................................................... 348/79
(58) Field of Classification Search
None
See application file for complete search history.

(56) References Cited

U.S. PATENT DOCUMENTS

| | | | |
|---|---|---|---|
| 6,795,573 B2 * | 9/2004 | Yoshida | 382/149 |
| 2003/0016301 A1* | 1/2003 | Aizaki et al. | 348/345 |
| 2006/0210262 A1 | 9/2006 | Fujiyoshi et al. | |
| 2008/0140317 A1 | 6/2008 | Fujiyoshi | |
| 2009/0102918 A1* | 4/2009 | Sakamoto et al. | 348/79 |
| 2009/0231464 A1 | 9/2009 | Nakamura | |

FOREIGN PATENT DOCUMENTS

| | | |
|---|---|---|
| JP | 2002-290803 | 10/2002 |
| JP | 2003-185931 | 7/2003 |
| JP | 2005-221708 | 8/2005 |
| JP | 2006-259630 | 9/2006 |
| JP | 2008-147908 | 6/2008 |
| JP | 2008-304613 | 12/2008 |
| JP | 2008304613 A * | 12/2008 |
| WO | WO 2007/057971 A1 | 5/2007 |

OTHER PUBLICATIONS

Japanese Office Action dated Oct. 16, 2012 issued in corresponding Japanese Patent Application No. 2009-002895 together with an English Language Translation.
Extended European Search Report dated May 18, 2010.

* cited by examiner

*Primary Examiner* — Sath V Perungavoor
*Assistant Examiner* — Kate Luo
(74) *Attorney, Agent, or Firm* — Scully, Scott, Murphy & Presser, P.C.

(57) ABSTRACT

A photomicroscopy system includes a microscope unit which outputs an enlarged image of a subject as a light flux, an image capturing unit which forms an image of the light flux output by the microscope unit and converts the formed image into digital data, a sensitivity changing unit which changes a sensitivity of the image capturing unit, and a computing unit which obtains an exposure time by using the digital data captured by the image capturing unit in a state where the sensitivity is increased to the high sensitivity after instructing the sensitivity changing unit to increase the sensitivity of the image capturing unit to the high sensitivity while calculating the exposure time for obtaining a suitable brightness by the image capturing unit, and sets the sensitivity of the image capturing unit to a low sensitivity after the exposure time is set in the image capturing unit.

14 Claims, 6 Drawing Sheets

| UPDATE TIMING OF LIVE IMAGE   ○ DURING COMPLETION OF AUTOMATIC EXPOSURE   ● AFTER COMPLETION OF AUTOMATIC EXPOSURE

PHOTOMICROSCOPY SYSTEM, IMAGE INPUT DEVICE, AND AUTOMATIC EXPOSURE METHOD

CROSS REFERENCE TO RELATED APPLICATIONS

This application claims the benefit of Japanese Patent Application No. 2009-2895 filed Jan. 8, 2008, the contents of which are incorporated by this reference.

BACKGROUND OF THE INVENTION

1. Field of the Invention

The present invention relates to a technique of image shooting using a microscope, and more particularly to a technique of automatic exposure used in shooting.

2. Description of the Related Art

With an image shooting apparatus provided with an automatic exposure function using brightness information of an image that is currently being observed with a microscope, a suitable brightness cannot normally be attained by once executing an automatic exposure process which therefore needs to be repeatedly executed.

With weak fluorescence microscopy, an exposure time increases in order to obtain an image of a suitable brightness due to a sample being dark. This leads to a problem in that a display update speed (frame rate) slows down because of an increase in the convergence time of an automatic exposure if the image of the sample is displayed live.

As a technique for obtaining an image of suitable brightness in photomicroscopy, a variety of methods have been proposed.

For example, Patent Document 1 (Japanese Laid-open Patent Publication No. 2003-185931) discloses a microscope including an LED light source and a brightness adjustment knob thereof. With the microscope disclosed by Patent Document 1, by operating the adjustment knob, the brightness of the LED light source can be pulse-controlled in synchronization with a driving pulse of a CCD (Charge Coupled Device), and the brightness of a subject can be adjusted.

Additionally, Patent Document 2 (Japanese Laid-open Patent Publication No. 2002-290803) discloses a system for increasing an output gain of a CCD when a dark sample is shot. With the system disclosed by Patent Document 2, the gain is set to a large value so as not to have noticeable noise because unnecessarily increasing the gain degrades image quality, an aperture is opened, and an exposure time is increased so as to make up for insufficient brightness, whereby a suitable exposure is obtained.

With this system, a display update speed (frame rate) of a live image slows down due to an increase in the exposure time, and the image is not immediately updated even though the orientation, the posture, a zoom magnification, or the like of a digital camera is changed. Therefore, the system according to Patent Document 2 is provided with a cancel button for canceling an exposure.

Furthermore, Patent Document 3 (Japanese Laid-open Patent Publication No. 2005-221708) discloses a photomicroscopy apparatus that makes up brightness by adjusting an illumination, and controls insufficient brightness by increasing the amount of amplification of a gain in order to implement a comfortable frame rate while suppressing degradation in image quality of even a dark sample to a minimum.

SUMMARY OF THE INVENTION

An object of the present invention is to provide an image input device and an automatic exposure method which can prevent a sample from being damaged without increasing the amount of light of a light source even in a live image that needs a long exposure, such as a weak fluorescence microscope image, and can shorten a convergence time of an automatic exposure.

Another object of the present invention is to provide an image input device and an automatic exposure method which can obtain a live image of good quality upon completion of an automatic exposure.

A photomicroscopy system according to the present invention includes: a microscope unit which outputs an enlarged image of a subject as a light flux; an image capturing unit which forms an image of the light flux output by the microscope unit, and converts the formed image into digital data; a sensitivity changing unit which changes a sensitivity of the image capturing unit; and a computing unit which obtains an exposure time by using the digital data captured by the image capturing unit in a state where the sensitivity is increased to a high sensitivity after instructing the sensitivity changing unit to increase the sensitivity of the image capturing unit to the high sensitivity while calculating the exposure time for obtaining a suitable brightness by the image capturing unit, and sets the sensitivity of the image capturing unit to a low sensitivity after the exposure time is set in the image capturing unit.

An image input device according to the present invention is an image input device for converting a light flux of an image observed with a microscope into a digital image, and for holding the digital image. The image input device includes: an image capturing unit which forms an image of the light flux output by a microscope unit and converts the formed image into digital data; a sensitivity changing unit which changes a sensitivity of the image capturing unit; and a computing unit which obtains an exposure time by using the digital data captured by the image capturing unit in a state where the sensitivity is increased to the high sensitivity after instructing the sensitivity changing unit to increase the sensitivity of the image capturing unit to the high sensitivity while calculating the exposure time for obtaining suitable brightness by the image capturing unit, and issues an instruction to set the sensitivity of the image capturing unit to a low sensitivity after the exposure time is set in the image capturing unit.

An automatic exposure method according to the present invention is an automatic exposure method used when an image is captured with a microscope. The automatic exposure method includes: obtaining an exposure time by using digital data captured by an image capturing unit in a state where a sensitivity of the image capturing unit is set to a high sensitivity while calculating the exposure time for obtaining a suitable brightness; and setting the sensitivity of the image capturing unit to a low sensitivity after setting the exposure time in the image capturing unit.

DESCRIPTION OF THE PREFERRED EMBODIMENTS

Embodiments according to the present invention are described in detail below with reference to the drawings.

A photomicroscopy system according to an embodiment focuses on a visual characteristic of being difficult to recognize degradation in image quality if an image changes with time like a moving subject to be observed, and of easy to recognize degradation in image quality if the image does not change.

Namely, sensitivity is improved at the expense of degradation in image quality by changing sensitivity of an image capturing unit such as an output gain of CCD, binning or the like while brightness is being changed by an automatic exposure. As a result, an exposure time is reduced to improve a frame rate. Moreover, the number of calculations of the automatic exposure per unit time is increased, and a completion time taken until a suitable exposure is obtained is reduced.

When the automatic exposure has been converged and a suitable exposure has been obtained, the sensitivity such as output gain of the CCD, binning or the like is restored to the former state. As a result, a high-quality live image with little noise can be obtained.

Figure 1A:
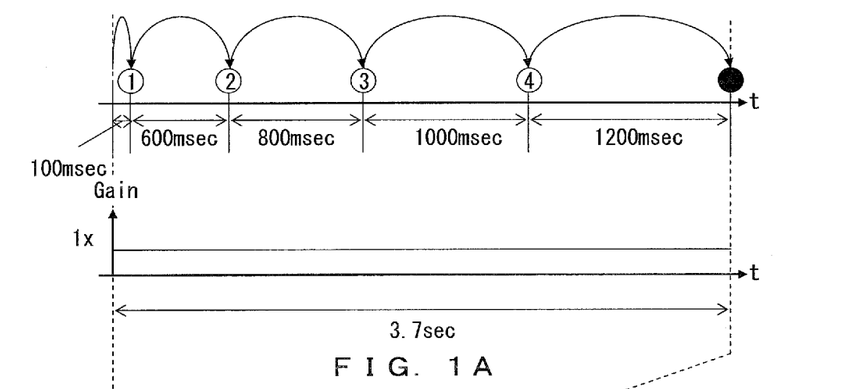
FIG. 1A illustrates how to perform an automatic exposure by a conventional photomicroscopy system and FIG. 1B illustrates how to perform an automatic exposure by a photomicroscopy system according to an embodiment.
Figure 1B:
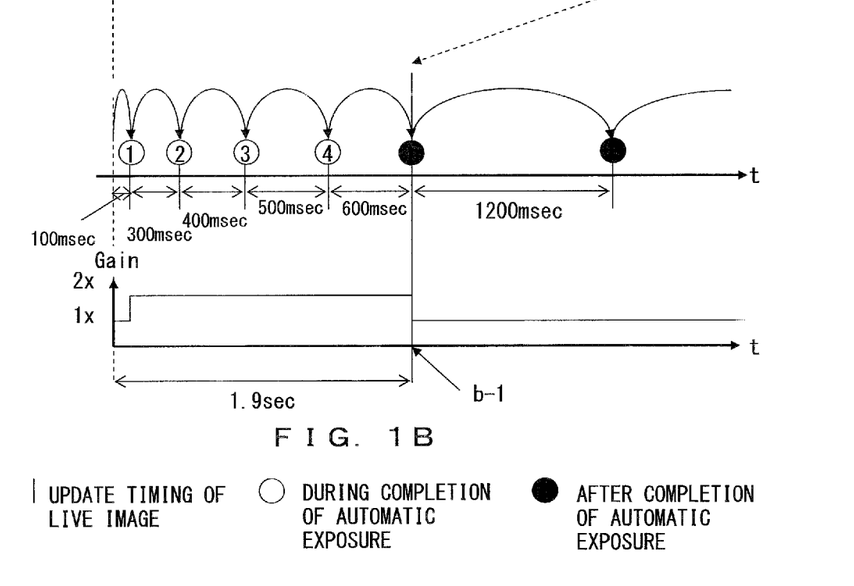

FIG. 1 illustrates a principle of the automatic exposure performed by the photomicroscopy system according to this embodiment.

FIG. 1A illustrates how to perform a conventional automatic exposure, whereas FIG. 1B illustrates how to perform an automatic exposure by the photomicroscopy system according to this embodiment.

In FIG. 1A, it is assumed that an exposure time, the output gain of the CCD, and an exposure time (suitable exposure time) for the finally suitable brightness are respectively 100 msec, 1×, and 1200 msec in an initial state.

A calculation of a predicted exposure time is repeated several times by using live images of several frames until the suitable exposure time is obtained. Assume here that the calculation of an exposure time is repeated four times and that a suitable exposure time of 120 msec is obtained in this example.

In the example illustrated in FIG. 1A, a suitable exposure time (1200 msec) is obtained after a calculation of a predicted exposure time is repeated at points 1, 2, 3, and 4 in this figure.

If the output gain or the binning of the CCD is not changed, an exposure time of 3.7 sec (=100 msec+600 msec+800 msec+1000 msec+1200 msec), obtained by totaling five exposure times, is needed until the automatic exposure is completed in the example illustrated in FIG. 1A.

In contrast, with the photomicroscopy system according to this embodiment, the gain is increased from 1× to 2× while the automatic exposure is being completed as illustrated in FIG. 1B. Therefore, the exposure time is reduced to approximately one half of the conventional exposure time. Accordingly, the total exposure time during the completion of the automatic exposure can be approximately halved to 1.9 sec (=100 msec+300 msec+400 msec+500 msec+600 msec).

In FIG. 1B, once the automatic exposure has been completed (b-1 in FIG. 1B), the value of the gain is restored to the former value (1×). Therefore, a high-quality live image can be obtained without being affected by noise caused by increasing the gain after the automatic exposure has been completed.

A configuration of the photomicroscopy system according to this embodiment is described next.

Figure 2:
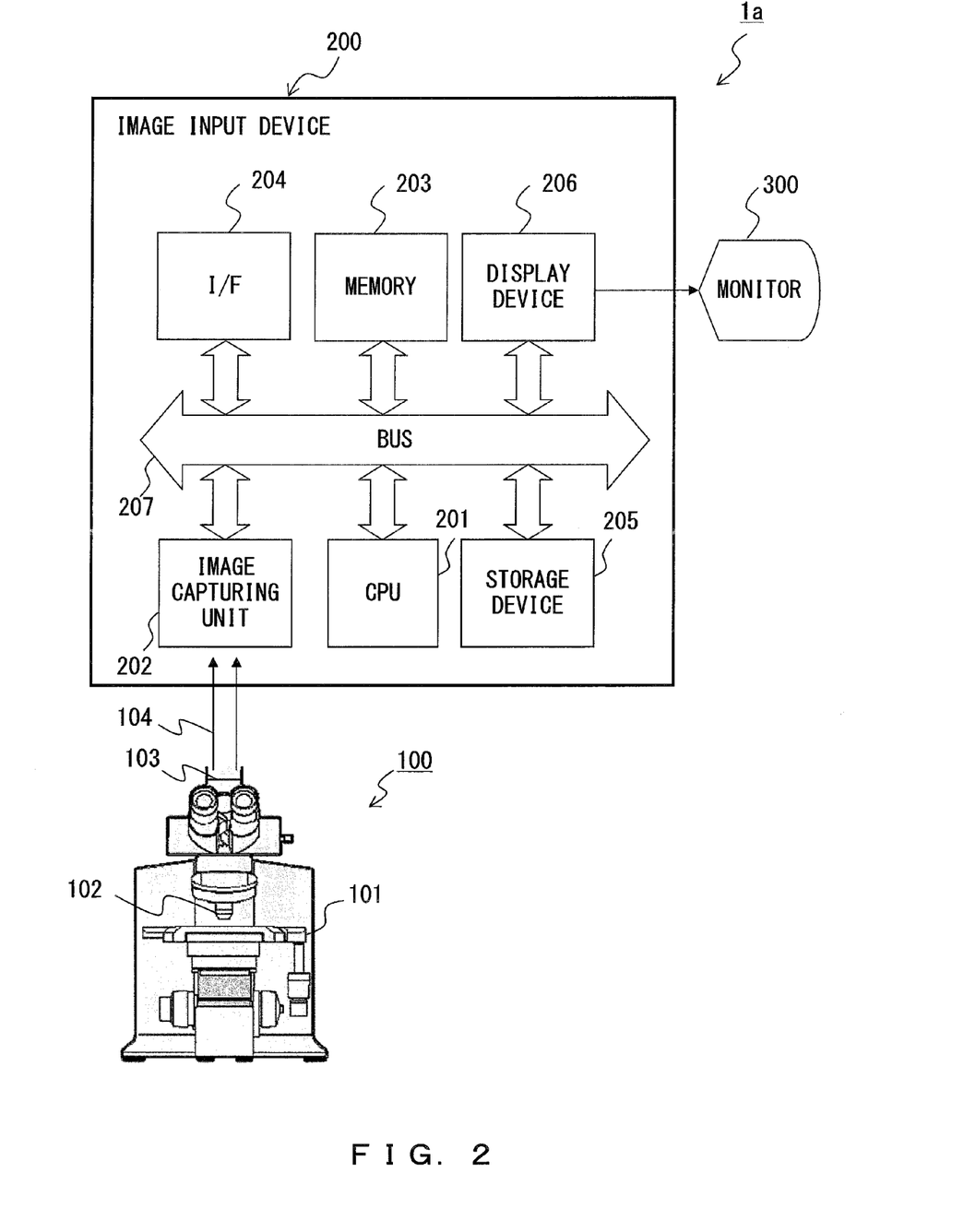
FIG. 2 illustrates an example of a configuration of a photomicroscopy system that is a premise of a first embodiment.

FIG. 2 illustrates an example of a configuration of a photomicroscopy system that is a premise of the first embodiment.

In this figure, the photomicroscopy system 1a has a configuration implemented by connecting a microscope 100 and an image input device 200.

The microscope 100 enlarges a sample placed on a stage 101 to a light flux 104 by using an objective lens 102 and an adapter lens 103. The light flux 104 is made incident to an image capturing unit 202 of the image input device 200, to be described later.

The image input device 200 has a configuration where a CPU 201, an interface (I/F) 204, a storage device 205, a memory 203, a display device 206, and an input device such as a keyboard, a pointing device or the like, which is not illustrated, are interconnected by a bus 207. A monitor 300 is connected to the display device 206.

The image input device 200 is provided in a TV optical path of the microscope 100 so that the light flux 204 is incident to the image capturing unit 202.

The bus 207 is a communication path for transferring an image and an instruction among the CPU 202, the image capturing unit 202, the storage device 205, the interface 204, the memory 203, the display device 206, and the input device. For example, the CPU 201 and the interface 204 transmit an instruction via the bus 207. Furthermore, the interface 204 and the memory 203 exchange image data via the bus 207. Since a communication is made via the bus 207 in this way, the description "via the bus 207" is omitted hereinafter because it is evident.

The CPU 201 controls the whole of the image input device 200. By executing a program stored in the memory 203 or the storage device 205 with the use of the memory 203 as a working memory, the CPU 201 implements various types of processes, which will be described later, of the image input device 200, such as a process for calculating a suitable exposure time on the basis of a live image stored in the memory 203, a process for determining whether or not to increase a gain by judging whether or not an automatic exposure is being completed, and other processes. Additionally, the CPU 201 issues an instruction to change the gain or the exposure time to the image capturing unit 202, or issues, to the interface 204, an instruction to transfer a digital image output by the image capturing unit 202 to an external device by executing the program. Furthermore, the CPU 201 receives an instruction issued from an external device via the interface 204, and executes a process according to the instruction.

"Setting the exposure time or the gain in the image capturing unit 202 by the CPU 201" means that an instruction to set the exposure or the gain is transmitted to the image capturing unit 202 via the bus 207.

The image capturing unit 202 converts the light flux 104 output from the microscope 100 into digital image data. The image capturing unit 202 can change the output gain of the CCD, the exposure time, the binning size or the like in accordance with an instruction issued from the CPU 201.

The interface 204 is an interface for connecting the image input device 200 to an external device. The interface 204 transfers image data stored in the memory 203 and digital image data received from the image capturing unit 202 to an external device. Moreover, the interface 204 notifies the CPU 201 of an instruction issued from an external device, or receives a response to the instruction from the CPU 201 and transmits the response to the external device.

The memory 203 holds image data obtained from the image capturing unit 202, and image data or program data read from the storage device 205 to be described later.

The display device 206 connects the image input device 200 and the monitor 300. The display device 206 displays and outputs image data loaded in the memory 203 on the monitor 300 in accordance with an instruction input by an observer.

The storage device 205 is a large-capacity nonvolatile memory. The storage device 205 stores a program executed by the CPU 201, and image data transferred from the image capturing unit 202.

In the photomicroscopy system 1a according to this embodiment having the above described configuration, an image observed with the microscope 100 is converted into image data by the image capturing unit 202 of the image input device 200, and the converted data is stored in the memory 203 or the storage device 205. In the photomicroscopy system 1a, an automatic exposure is performed when an observed image is captured. A process of this automatic exposure is implemented in a way such that the CPU 201 of the image input device 200 executes a program stored in the memory 203 or the storage device 205.

The configuration illustrated in FIG. 2 is a configuration adopted when the process of the automatic exposure is implemented by software. However, the photomicroscopy system 1a according to this embodiment is not limited to such a configuration, and may be configured with dedicated hardware for implementing functions executed by the image input device 200. Namely, the present invention may be implemented with a hardware technique.

An operational process executed by the image input device 200 when the automatic exposure is performed is described next.

Figure 3:
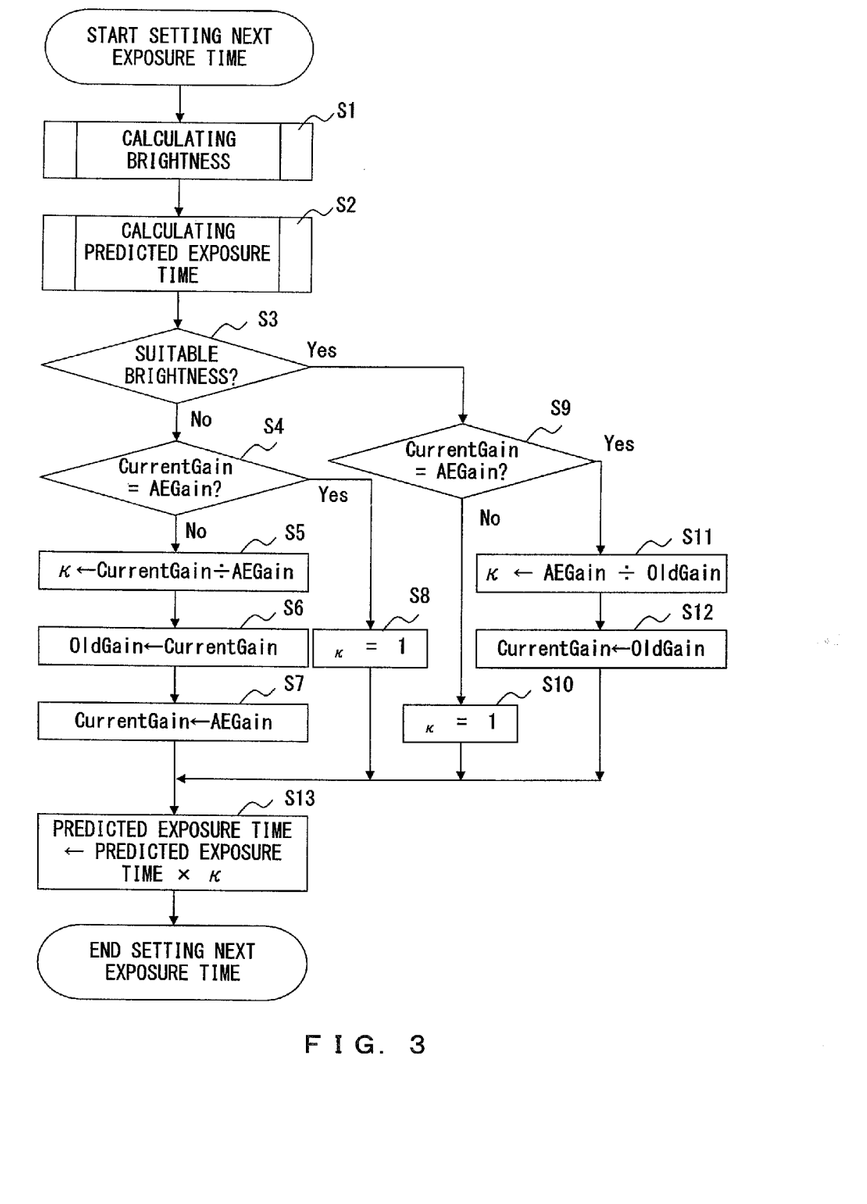
FIG. 3 is a flowchart illustrating an operational process of an image input device in the first embodiment.

FIG. 3 is a flowchart illustrating the operational process executed by the image input device 200 in the first embodiment.

In the operational process executed in the first embodiment, the automatic exposure is performed by increasing the sensitivity of the image capturing unit 202 with the use of an increased output gain of the CCD of the image capturing unit 202, and the output gain is decreased when an exposure time is decided. The following description refers to, as an example, an implementation of the operational process using a software technique by which the CPU 201 executes a program to implement respective processes. However, if this operational process is implemented with a hardware technique, the respective content of each of the processes themselves is identical to the content of the process illustrated in FIG. 3, except that the process is executed by a different entity.

Once an observer has activated the photomicroscopy system 1a, the program is loaded from the storage device 205 into the memory 203. Then, the CPU 201 executes the program loaded into the memory 203, and executes an initialization process for the system.

With the initialization process, the CPU executes processes needed for the automatic exposure process, such as a process for setting CurrentGain, which indicates the current output gain of the CCD of the image capturing unit 202, and for setting an exposure time to 1x and the shortest exposure time respectively, a process for setting the gain and the exposure time in the image capturing unit 202, and other processes.

Upon termination of the initialization process, the CPU 201 issues a live image transfer request to the image capturing unit 202. Upon receipt of the live image transfer request, the image capturing unit 202 converts the light flux 104 into digital image data of one image (hereinafter referred to as a live image). This live image is transferred from the image capturing unit 202 to the memory 203. Upon completion of transferring the live image, the image capturing unit 202 transmits a live image transfer completion notification to the CPU 201.

Upon receipt of the live image transfer completion notification, the CPU 201 calculates the brightness of the image on the basis of the live image stored in the memory 203 in step S1. The brightness of an image is the average brightness of the entire image.

Next, in step S2, the CPU 201 calculates a predicted exposure time on the basis of the brightness of the live image, which is obtained in step S1.

The predicted exposure time is calculated on the basis of an exposure time (current exposure time) used to obtain the live image by using a ratio of the brightness of the image, which is obtained in step S1, to a suitable brightness. Assuming that the suitable brightness is 215 and the brightness of the image, which is obtained in step S1, is 100, a brightness of a multiple of 215/100=2.15 of the current brightness is needed. Therefore, an exposure time obtained by multiplying the current exposure time by 2.15 is set as the predicted exposure time. This is represented by the following expression.

$$\text{predicted exposure time} = \text{current exposure time} \times \text{suitable brightness} / \text{brightness of image}$$

Then, in step S3, the CPU 201 determines whether or not the brightness of the image which is obtained in step S1 is suitable. This determination is made by judging whether or not the brightness of the image which is obtained in step S1 is within a particular range of the suitable brightness. This determination is made, for example, by judging whether or not the brightness of the image is within a range of 215±2 if the suitable brightness is 215.

If the brightness of the image is determined not to be suitable as a result of this determination ("No" in step S3), the CPU 210 determines that the automatic exposure is still in the process of being completed. Then, the flow goes to step S4. In contrast, if the brightness of the image is determined to be suitable as a result of this determination ("Yes" in step S3), the CPU 210 determines that the automatic exposure has been completed. Then, the flow goes to step S9.

In step S4, the CPU 201 determines whether or not the output gain (CurrentGain) of the CCD of the image capturing unit 202 is a gain (AEGain) used while the automatic exposure is being completed. AEGain is a gain value used while the automatic exposure is being completed. Normally, AEGain is a maximum settable gain.

Accordingly, in step S4, a comparison is made between CurrentGain and AEGain. If CurrentGain is equal to AEGain ("Yes" in step S4), the CPU 201 determines that the gain has already been increased to AEGain. There is no need to increase the exposure time by the amount of increase in the gain. Therefore, in step S8, 1 is substituted for an exposure time correction coefficient κ for correcting an exposure time. Then, the flow goes to step S13. The exposure time correction coefficient κ is used to correct the exposure time later.

If CurrentGain is not equal to AEGain in step S4 ("No" in step S4), the gain has not been increased to AEGain yet. Therefore, a process for increasing the gain of the image capturing unit 202 to a value used while the automatic exposure is being completed is executed in steps S5 to S7.

Initially, in step S5, the CPU 201 obtains a ratio of the current gain value (CurrentGain) to AEGain, and substitutes the ratio for the exposure time correction coefficient κ. This is represented by the following expression.

$$\kappa \leftarrow \text{CurrentGain} \div \text{AEGain}$$

For example, if CurrentGain and AEGain are respectively 1x and 2x in the above expression, K=1x÷2x=0.5 is obtained.

Next, in step S6, the CPU 201 stores the value of CurrentGain in OldGain, which is a variable indicating the gain before the automatic exposure is calculated. OldGain is used later upon completion of the automatic exposure.

In step S7, the CPU 201 substitutes the value of AEGain for CurrentGain so as to set the value of AEGain to the current gain. Then, the CPU 201 notifies the image capturing unit 202 to set the value of CurrentGain as the output gain of the CCD. Then, the flow goes to step S13.

In contrast, if it is determined that the brightness of the image is a suitable brightness as a result of the determination made in step S3 and that the automatic exposure has been completed, the CPU 201 executes processes in steps S9 to S12.

In step S9, the CPU 201 determines whether or not CurrentGain is equal to AEGain. If CurrentGain is not equal to AEGain ("No" in step S9), the CPU 201 determines that the automatic exposure has been completed and the state of increasing the gain has been released. Then, the CPU 201 substitutes 1 for the exposure time correction coefficient κ. Then, the flow goes to step S13.

If it is determined that CurrentGain is equal to AEGain in step S9 ("Yes" in step S9), the CPU 201 determines that the current gain is being increased although the automatic exposure has been completed. Then, in step S11, the CPU 201 obtains a ratio of the value of OldGain, which is the value of the gain before being increased, to the value of AEGain, and substitutes the obtained ratio for the exposure time correction coefficient κ. This calculation is represented by the following expression.

$$\kappa \leftarrow AEGain \div OldGain$$

For example, if OldGain and AEGain are respectively 1x and 2x in the above expression, κ=2x÷1x=2 is obtained. The exposure time correction coefficient κ calculated here is used to correct the exposure time in step S13 to be described later. κ is used to correct the exposure time so as not to decrease the brightness of the image when the gain is restored to the former gain (OldGain) after the automatic exposure has been completed.

After setting the exposure time correction coefficient κ, the CPU 201 substitutes OldGain for CurrentGain, and sets the value of CurrentGain as the output gain of the CCD in the image capturing unit 202 in step S12.

In step S13, the predicted exposure time is corrected by using the exposure time correction coefficient κ set in step S5, S8, S10 or S11. An expression of this correction is represented as follows.

$$current\ exposure\ time = predicted\ exposure\ time \times \kappa$$

For example, if the exposure time correction coefficient κ is set in step S5, the automatic exposure has not been completed yet. Therefore, CurrentGain has the value of AEGain, and the exposure time corresponds to CurrentGain/AEGain of the first predicted exposure time. If the exposure time correction coefficient κ is set in step S8, the automatic exposure has not been completed yet. However, both the value of CurrentGain and the exposure time have been changed to values used to complete the automatic exposure. Therefore, the exposure time has the same value as that obtained in step S2. If the exposure time correction coefficient κ is set in step S10, the automatic exposure has already been completed, and the value of CurrentGain has been restored to the former value (OldGain) in response to the completion of the automatic exposure. Therefore, the exposure time has the same value as that obtained in step S2. If the exposure time correction coefficient κ is set in step S11, the value of CurrentGain still has the value (AEGain) used to complete the automatic exposure although the automatic exposure has already been completed. Therefore, the exposure time is multiplied by AEGain/CurrentGain.

Then, the CPU 201 sets the current exposure time updated in step S13 as an exposure time of the next shooting in the image capturing unit 202.

With the above described processes, the exposure time and the gain of the next live image have been set in the image capturing unit 202.

Upon termination of the process illustrated in FIG. 3, the CPU 201 requests the image capturing unit 202 to transfer the next live image. When data of the live image is transmitted from the image capturing unit 202 to the memory 203, the flow goes back to step S1 of FIG. 3, in which the CPU 201 repeats similar processes. Then, the CPU 201 stores the data transferred from the image capturing unit 202 in the memory 203 or the storage device 205, and/or displays the data of the image on the monitor 300 via the display device 206.

As described above, according to the first embodiment, the completion time of the automatic exposure can be shortened by improving the frame rate with the use of an increased gain of the image capturing unit 202 without increasing the amount of illumination, light during the automatic exposure even when a weak fluorescence microscope image is observed. Moreover, the gain is restored to the former value upon completion of the automatic exposure, whereby a live image with little noise can be obtained after the automatic exposure has been completed.

As a result, a sample can be prevented from being damaged by light stimulation even in a weak fluorescence microscope image. Moreover, the completion of the automatic exposure can be shortened, and an image with little noise can be viewed after the automatic exposure has been completed. Accordingly, a photomicroscopy system easy-to-use for an observer can be implemented.

In the above described example, a brightness average of the entire image is obtained as the method for calculating the brightness of the image. However, the method according to this embodiment is not limited to this one. Brightness within a particular range from the center of an image or a brightness average within another range may be used. Additionally, the brightness of an image may be obtained on the basis of not a brightness average but the peak position of a histogram. The method for calculating the brightness of an image does not depend on the characteristics of the present invention.

In the above provided example, whether or not the brightness of the image is suitable is determined by judging whether or not the brightness of the image is within the brightness range (215±2) of the suitable brightness used as a determination reference. However, this determination may be made by using a range of another brightness used as a determination reference, or by combining a plurality of determination references.

Additionally, in the above described example, the value of AEGain used while the automatic exposure is being completed is assumed to be 2x. However, the value of AEGain may be 4x, 8x or 16x. The value of AEGain does not depend on the characteristics of the present invention.

A process executed by the image input device 200 in a second embodiment is described next.

Figure 4:
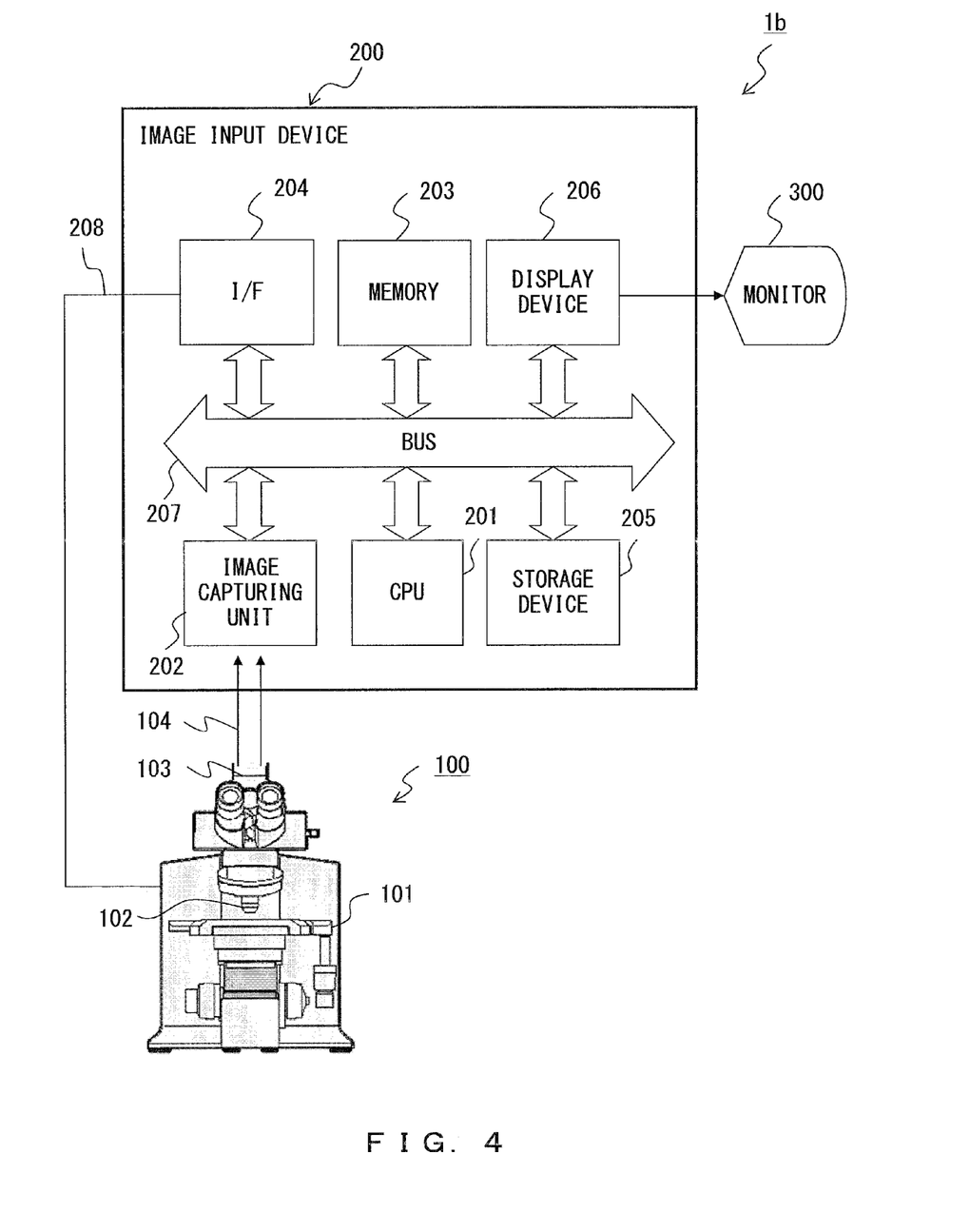
FIG. 4 illustrates an example of a configuration of a photomicroscopy system that is a premise of a process executed in a second embodiment.

FIG. 4 illustrates an example of a configuration of a photomicroscopy system 1b that is a premise of the process executed in the second embodiment.

In this figure, in the photomicroscopy system 1b, the microscope 100 and the image input device 200 are electrically connected. Upon detection of an operation performed for a part of the microscope which exerts an influence on an image observed with a microscope, such as a moving of the stage 101, a selection of the objective lens 102, or the like, the microscope 100 notifies the image input device 200 that the operation has been detected. By increasing the gain of the image capturing unit 202 on the basis of this notification, the image input device 200 shortens an actual exposure time so as to improve the frame rate. As a result, the length of time taken to complete the automatic exposure is shortened, and the frame rate of a live image being operated is improved, whereby operability can be enhanced.

As illustrated in FIG. 4, the image input device 200 is logically connected to the microscope 100 by the interface 204 wiredly 208 or wirelessly. Therefore, a change in the state of the microscope 100 which exerts an influence on a microscope image, such as a moving of the stage 101, a magnification change or the like, can be reported to the image input device 200.

The image capturing unit 202 has a function of stopping the exposure. Upon receipt of an exposure stop request issued from the CPU 201, the image capturing unit 202 stops an operation of the currently executed automatic exposure process. Namely, if an observer changes a part of the microscope that exerts an influence on a microscope image—for example, if the observer moves the stage 101 or replaces the objective lens 102—information indicating that such an operation has started is reported to the CPU 201 via the interface 204. Upon receipt of this information, the CPU 201 stores, in the memory 203, information indicating that the corresponding part of the microscope 100 is operating. Then, the CPU 201 transmits, to the image capturing unit 202, a request to stop the automatic exposure process, and a request to transfer a live image. When the part that is operating in the microscope 100 completes the operation, this completion is similarly reported from the microscope 100 to the CPU 201 via the interface 204. Upon receipt of this notification, the CPU 201 stores, in the memory 203, information indicating that the corresponding part is stopping its operation.

An operational process of the image input device 200 in the second embodiment is described in detail below with reference to the flowchart illustrated in FIG. 5.

Figure 5:
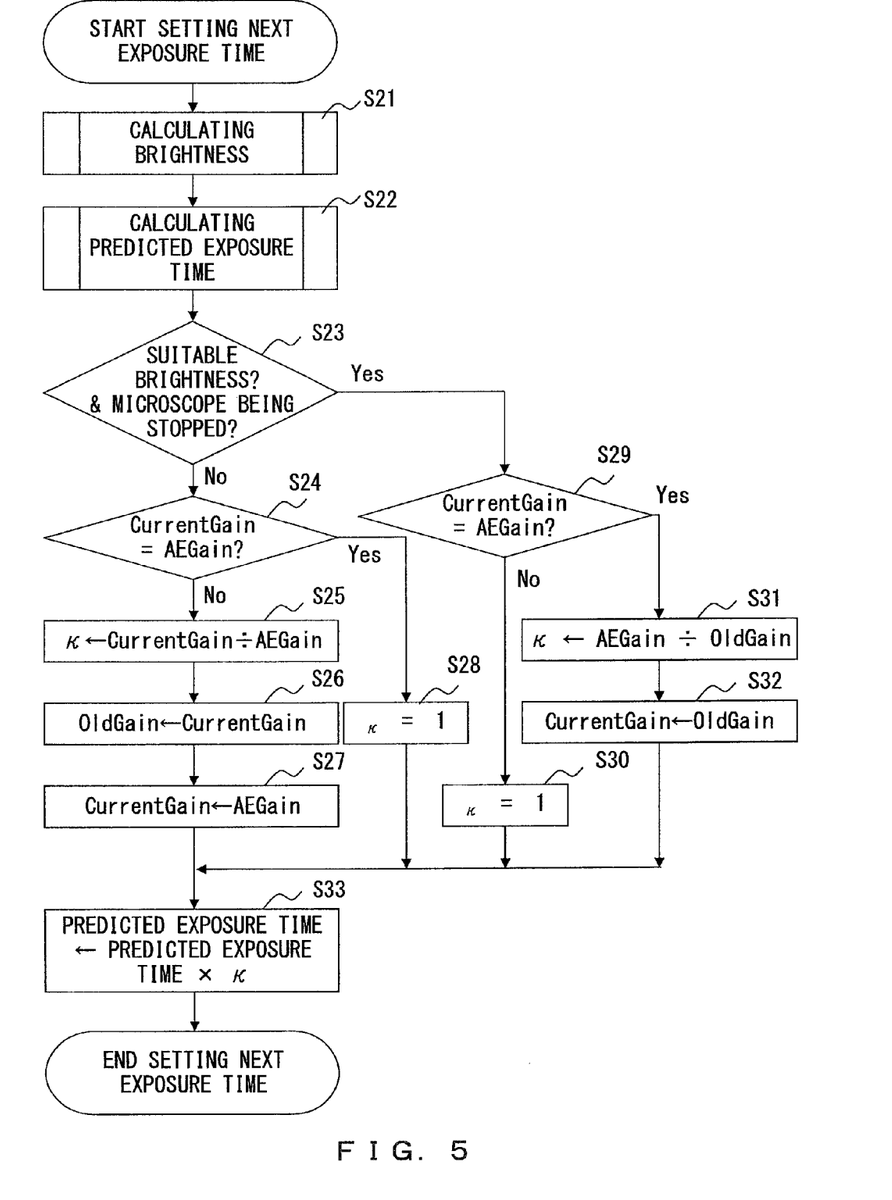
FIG. 5 is a flowchart illustrating an operational process of the image input device in the second embodiment.

Compared with the process flow illustrated in FIG. 3, processes of steps S21, S22, and S24 to S33 in the flow illustrated in FIG. 5 are fundamentally identical to those of steps S1, S2 and S4 to S13 in FIG. 3 except that only step S23 is different from step S3 of FIG. 3. Accordingly, descriptions of the identical processes are omitted.

After obtaining the brightness of an image transferred from the image capturing unit 202 in step S21 and calculating a predicted exposure time in step S22, the CPU 201 determines whether or not the brightness of the image, which is obtained in step S21, is a suitable brightness in a similar manner as in step S3 of FIG. 3, and also determines whether or not the microscope 100 is performing an operation that exerts an influence on the microscope image.

If the brightness of the image which is obtained in step S21 is a suitable brightness and the microscope 100 is being stopped in step S23 ("Yes" in step S23), the flow goes to step S29. If these conditions are not satisfied ("No" in step S23), this indicates that the automatic exposure is being completed or the microscope 100 is performing an operation that exerts an influence on the microscope image. Therefore, the flow goes to step 24 in which the CPU 201 increases the gain.

By increasing the gain during the automatic exposure in the second embodiment in a similar manner as in the first embodiment, the frame rate can be improved without increasing the amount of illumination light, and the completion time of the automatic exposure can be shortened. When the automatic exposure has been completed, the gain is restored to the former value. As a result, a live image with little noise can be displayed. Moreover, the frame rate can be improved by increasing the gain even while a microscope part that exerts an influence on a microscope image is being operated. Then, the gain is restored to the former value when the operation of the microscope part has been stopped and the automatic exposure has been completed, whereby a live image with little noise can be displayed.

In this way, a sample can be prevented from being damaged by illumination light even in a weak fluorescence microscope image, and an image with little noise can be viewed after the automatic exposure has been completed. Moreover, if an observer performs, for the microscope 100, an operation that changes an image, for example, an operation of moving the stage or of changing the objective lens, a response to the change in the live image can be quickly made while the microscope 100 is being operated, and a photomicroscopy system that is easy for an observer to use can be realized.

A process executed by the image input device 200 in a third embodiment is described next.

In the first embodiment, the gain of the image capturing unit 202, which is used during the completion of the automatic exposure, is changed to the gain used after the completion of the automatic exposure. In contrast, in the third embodiment, the sensitivity of the image capturing unit 202 is altered by changing binning of the image capturing unit 202, which is used during the completion of the automatic exposure, to binning used after the completion of the automatic exposure.

The binning of the image capturing unit 202 is a function for amplifying and detecting a signal by virtually increasing the size of light-reception area with a collection of some adjacent elements (pixels) on a CCD chip of the image capturing unit 202. The sensitivity is fundamentally proportional to the area size of the CCD. Therefore, the sensitivity increases by four times if the binning is 2 (2×), or the sensitivity increases by 16 times if the binning is 4 (4×4). With the binning, a noise can be suppressed even though a resolution is reduced.

If the binning is increased, the sensitivity of the image capturing unit 202 is improved in a similar manner as in the case of increasing the gain. Therefore, the frame rate can be improved. Accordingly, the completion time of the automatic exposure is shortened by increasing the binning during the automatic exposure process, and the resolution is improved by restoring the binning to the former state after the completion of the automatic exposure.

The image capturing unit 202 has a binning switching function, and can switch among binning options of 1×1, 2×2, 4×4, 8×8 or the like in accordance with an instruction issued from the CPU 201. In the third embodiment, the binning that is normally set to, for example, 1×1 is increased to 2×2 so as to improve the sensitivity by four times during the automatic exposure, and the binning is restored to 1×1 upon completion of the automatic exposure.

A configuration that is premised on the process executed in the third embodiment by the image input device 200 may be a configuration that is premised on the first embodiment illustrated in FIG. 2, or a configuration that is premised on the second embodiment illustrated in FIG. 4.

An operational process of the image input device 200 in the third embodiment is described in detail below.

Figure 6:
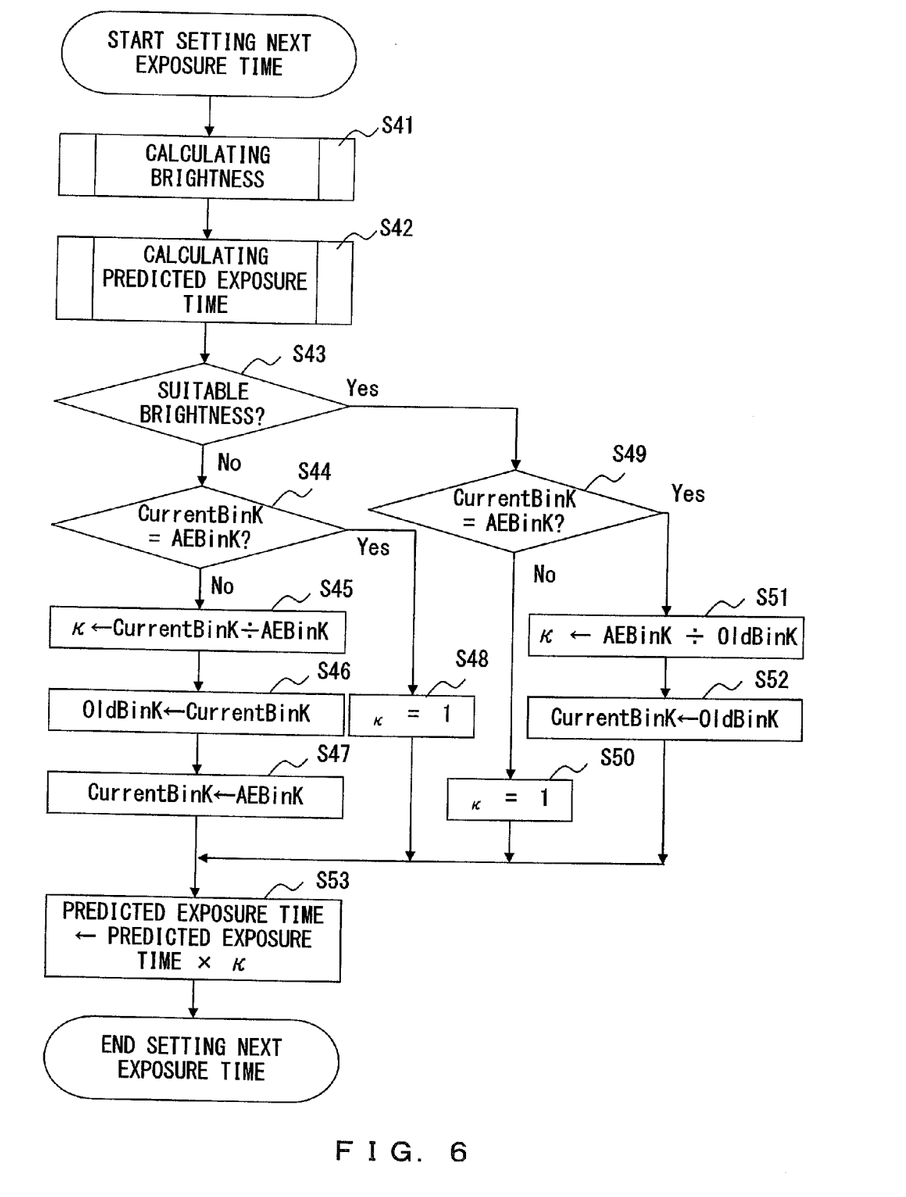
FIG. 6 is a flowchart illustrating an operational process of the image input device in a third embodiment.

FIG. 6 is a flowchart illustrating the operational process of the image input device 200 in the third embodiment. This figure illustrates an example of a case where the photomicroscopy system 1 is implemented by adopting the configuration that is premised on the first embodiment illustrated in FIG. 2. However, the microscope system 1 may be implemented by adopting the configuration that is premised on the third embodiment illustrated in FIG. 4 as described above. In this case, a process for determining whether or not the microscope 110 is performing an operation that exerts an influence on a microscope image is added in step S43 of FIG. 6 in addition to the process, which is similarly executed in step S23 of FIG. 5, for determining whether or not an obtained brightness is a suitable brightness.

Once an observer has activated the photomicroscopy system 1, a program is loaded from the storage device 205 into the memory 203. Then, the CPU 201 executes an initialization process for the photomicroscopy system 1 by executing the program loaded into the memory 203.

As the initialization process, processes necessary for the automatic exposure process, such as a process for setting CurrentBinK, which indicates the current binning of the image capturing unit 202, and an exposure time to 1×1 and the shortest exposure time respectively, a process for setting the binning and the exposure time in the image capturing unit 202, and other processes are executed.

Upon termination of the initialization process, the CPU 201 issues a live image transfer request to the image capturing unit 202. Upon receipt of the live image transfer request, the image capturing unit 202 converts the light flux 104 into a live image. Then, the live image is transferred from the image capturing unit 202 to the memory 203. Upon completion of the transfer, the image capturing unit 202 transmits a live image transfer completion notification to the CPU 201.

Upon receipt of the live image transfer completion notification, the CPU 201 calculates the brightness of the image on the basis of the live image stored in the memory 203 in step S41 of FIG. 6. Average brightness of the entire image is obtained as the brightness of the image.

Next, in step S42, the CPU 201 calculates a predicted exposure time on the basis of the brightness of the live image, which is obtained in step S41.

Then, in step S43, the CPU 201 determines whether or not the brightness of the image which is obtained in step S41 is a suitable brightness. This determination is made by judging whether or not the brightness of the image which is obtained in step S41 is within a particular range of the suitable brightness.

If the brightness of the image is determined not to be a suitable brightness as a result of this determination ("No" in step S43), the CPU 201 determines that the automatic exposure is being completed. Then, the flow goes to step S44. In contrast, if the brightness of the image is determined to be a suitable brightness as a result of the determination ("Yes" in step S43), the CPU 201 determines that the automatic exposure has been completed. Then, the flow goes to step S49.

In step S44, the CPU 201 determines whether or not the current binning (CurrentBinK) of the image capturing unit 202 is binning (AEBinK) used while the automatic exposure is being completed.

Accordingly, a comparison is made between CurrentBinK and AEBinK in step S44. If CurrentBinK is equal to AEBinK ("Yes" in step S44), the CPU 201 determines that the binning has been increased to AEBinK. There is no need to correct the exposure time by the amount of an increase in the binning.

Therefore, in step S48, 1 is substituted for the exposure time correction coefficient κ for correcting an exposure time. Then, the flow goes to step S53.

If CurrentBinK is not equal to AEBinK in step S44 ("No" in step S44), the binning has not been increased to AEBinK yet. Therefore, a process for increasing the binning of the image capturing unit 202 to a value used while the automatic exposure is being completed is executed in steps S45 to S47.

Initially, in step S45, the CPU 201 obtains a ratio of the current binning value (CurrentBinK) to AEBinK, and substitutes the obtained ratio for the exposure time correction coefficient κ. This substitution is represented by the following expression.

$$\kappa \leftarrow \text{CurrentBink} \div \text{AEBinK}$$

For example, if CurrentBinK and AEBinK are respectively 1×1 and 2×2 in the above expression, $\kappa=(1\times1)\div(2\times2)=0.25$ is obtained.

Next, in step S46, the CPU 201 stores the value of CurrentBinK in OldBinK that is the variable indicating the binning before the automatic exposure is calculated. OldBinK is used later upon completion of the automatic exposure.

In step S47, the CPU 201 substitutes the value of AEBinK for CurrentBinK, and sets the value of AEBinK as the current binning. Next, the CPU 201 notifies the image capturing unit 202 to set the value of CurrentBinK as the binning value of the image capturing unit 202. Then, the flow goes to step S53.

In contrast, if it is determined that the brightness of the image is a suitable brightness as a result of the determination made in step S43 and the automatic exposure has been completed, the CPU 201 executes processes in steps S49 to S52.

In step S49, the CPU 201 determines whether or not CurrentBinK is equal to AEBinK. If CurrentBinK is not equal to AEBinK ("No" in step S49), the CPU 201 determines that the automatic exposure has been completed and the state of increasing the BinK has been released. Therefore, the CPU 201 substitutes 1 for the exposure time correction coefficient x in step S50. Then, the flow goes to step S53.

In contrast, if it is determined that CurrentBinK is equal to AEBinK ("Yes" in step S49), the CPU 201 determines that the binning is being increased even though the automatic exposure has been completed. Then, in step S51, the CPU 201 obtains a ratio of the value of OLdBinK, which is the value of binning before being increased, to the value of AEBinK, and substitutes the obtained ratio for the exposure time correction coefficient κ. This calculation is represented by the following expression.

$$\kappa \leftarrow \text{AEBinK} \div \text{OldBinK}$$

For example, if OldBinK and AEBinK are respectively 1×1 and 2×2 in the above expression, $\kappa=(2\times2)\div(1\times1)=4$ is obtained. The exposure time correction coefficient κ calculated here is used to correct the exposure time in step S53 to be described later. Namely, κ is used to correct the exposure time so as to prevent the brightness of the image from being darkened when the binning is restored to the former binning (OldBinK) before being increased after the automatic exposure has been completed.

After setting the exposure time correction coefficient κ, the CPU 201 substitutes OldBinK for CurrentBinK in step S52, and sets the value of CurrentBinK in the image capturing unit 202 as the binning.

In step S53, a predicted exposure time is corrected by using the exposure time correction coefficient K set in step S45, S48, S50, or S51. This correction is represented by the following expression.

$$\text{current exposure time} = \text{predicted exposure time} \times \kappa$$

The CPU 201 sets the current exposure time, which is updated in step S53, in the image capturing unit 202 as the exposure time of the next shooting.

With the above described processes, the exposure time and the binning of the next live image have been set in the image capturing unit 202.

Upon termination of the process illustrated in FIG. 6, the CPU 201 requests the image capturing unit 202 to transfer the next live image. When data of the live image is transferred from the image capturing unit 202 to the memory 203, the flow goes back to step S41 of FIG. 3 in which the CPU 201 repeats similar processes.

As described above, according to the third embodiment, a frame rate can be improved with the use of a binning characteristic by improving a sensitivity as a result of changing binning to binning of a high sensitivity during an automatic exposure without increasing the amount of illumination light, whereby the completion time of the automatic exposure can be shortened. Upon completion of the automatic exposure, the binning is restored to the former state, whereby a live image with little noise can be displayed.

In this way, a sample can be prevented from being damaged by light stimulus even in a weak fluorescence microscope image. Moreover, the completion time of an automatic exposure is short, and an image with little noise can be viewed after the automatic exposure has been completed. Accordingly, a photomicroscopy that is easy for an observer to use can be provided.

What is claimed is:

1. A photomicroscopy system, comprising:
   a microscope unit which outputs an enlarged image of a subject as a light flux;
   an image capturing unit which forms an image of the light flux output by the microscope unit, and converts the formed image into digital data;
a sensitivity changing unit which changes a sensitivity of the image capturing unit; and
   a computing unit which obtains an exposure time by using the digital data captured by the image capturing unit in a state where the sensitivity is increased to a maximum sensitivity after instructing the sensitivity changing unit to increase the sensitivity of the image capturing unit from an initial sensitivity to the maximum sensitivity while calculating the exposure time for obtaining a suitable brightness by the image capturing unit, and sets the sensitivity of the image capturing unit back to the initial sensitivity after the exposure time is set in the image capturing unit;
   wherein the computing unit is configured to calculate an intermediate exposure time on the basis of a ratio of brightness of the digital data, which is captured at the maximum sensitivity, to a suitable brightness until a brightness obtained on the basis of the digital data reaches the suitable brightness while calculating the exposure time, and adjust the intermediate exposure time using an exposure time correction coefficient which is determined from the maximum sensitivity and the initial sensitivity.

2. The photomicroscopy system according to claim 1, further comprising a display unit which displays the image on the basis of the digital data captured by the image capturing unit.

3. The photomicroscopy system according to claim 1, further comprising a storage unit which stores the digital data converted by the image capturing unit.

4. The photomicroscopy system according to claim 1, wherein the microscope unit irradiates the subject with a same amount of illumination light in a state where the sensitivity of the image capturing unit is increased to a high sensitivity and a state where the sensitivity of the image capturing unit is set to a low sensitivity.

5. An image input device for converting a light flux of an image observed with a microscope into a digital image, and for holding the digital image, comprising:
   an image capturing unit which forms an image of the light flux output by a microscope unit, and converts the formed image into digital data;
   a sensitivity changing unit which changes a sensitivity of the image capturing unit; and
   a computing unit which obtains an exposure time by using the digital data captured by the image capturing unit in a state where the sensitivity is increased to a maximum sensitivity after instructing the sensitivity changing unit to increase the sensitivity of the image capturing unit from an initial sensitivity to the maximum sensitivity while calculating the exposure time for obtaining a suitable brightness by the image capturing unit, and sets the sensitivity of the image capturing unit back to the initial sensitivity after the exposure time is set in the image capturing unit;
   wherein the computing unit is configured to calculate an intermediate exposure time on the basis of a ratio of brightness of the digital data, which is captured at the maximum sensitivity, to a suitable brightness until a brightness obtained on the basis of the digital data reaches the suitable brightness while calculating the exposure time, and adjust the intermediate exposure time using an exposure time correction coefficient which is determined from the maximum sensitivity and the initial sensitivity.

6. The image input device according to claim 5, wherein the sensitivity is a maximum sensitivity of the image capturing unit.

7. The image input device according to claim 5, wherein the exposure time is obtained by using, for the intermediate exposure time when the exposure time is obtained, a ratio of a sensitivity before being changed to the high sensitivity to a sensitivity after being changed.

8. The image input device according to claim 5, wherein the image capturing unit includes a CCD, and the sensitivity is an amplification ratio of an output of the CCD.

9. The image input device according to claim 5, wherein the sensitivity is a binning of the image capturing unit.

10. The image input device according to claim 5, further comprising
   an operation detecting unit which detects an operation performed for the microscope, wherein
   the computing unit instructs the sensitivity changing unit to set a sensitivity of the image capturing unit to a high sensitivity also when the operation unit detects the operation performed for the microscope.

11. A photomicroscopy system, comprising:
   microscope means for outputting an enlarged image of a subject as a light flux;
   image capturing means for forming an image of the light flux output by the microscope means, and for converting the formed image into digital data;
   sensitivity changing means for changing a sensitivity of the image capturing means; and
   computing means for obtaining an exposure time by using the digital data captured by the image capturing unit in a state where the sensitivity is increased to a maximum sensitivity after instructing the sensitivity changing unit to increase the sensitivity of the image capturing unit from an initial sensitivity to the maximum sensitivity while calculating the exposure time for obtaining a suitable brightness by the image capturing unit, and sets the sensitivity of the image capturing unit back to the initial sensitivity after the exposure time is set in the image capturing unit;

wherein the computing means is configured to calculate an intermediate exposure time on the basis of a ratio of brightness of the digital data, which is captured at the maximum sensitivity, to a suitable brightness until a brightness obtained on the basis of the digital data reaches the suitable brightness while calculating the exposure time, and adjust the intermediate exposure time using an exposure time correction coefficient which is determined from the maximum sensitivity and the initial sensitivity.

12. An image input device for converting a light flux of an image observed with a microscope into a digital image, and for holding the digital image, comprising:

image capturing means for forming an image of the light flux output by microscope means, and for converting the formed image into digital data;

sensitivity changing means for changing a sensitivity of the image capturing means;

computing means for obtaining an exposure time by using the digital data captured by the image capturing unit in a state where the sensitivity is increased to a maximum sensitivity after instructing the sensitivity changing unit to increase the sensitivity of the image capturing unit from an initial sensitivity to the maximum sensitivity while calculating the exposure time for obtaining a suitable brightness by the image capturing unit, and sets the sensitivity of the image capturing unit back to the initial sensitivity after the exposure time is set in the image capturing unit;

wherein the computing means is configured to calculate an intermediate exposure time on the basis of a ratio of brightness of the digital data, which is captured at the maximum sensitivity, to a suitable brightness until a brightness obtained on the basis of the digital data reaches the suitable brightness while calculating the exposure time, and adjust the intermediate exposure time using an exposure time correction coefficient which is determined from the maximum sensitivity and the initial sensitivity.

13. An automatic exposure method used when an image is captured with a microscope, comprising:

obtaining an exposure time by using digital data captured by an image capturing unit in a state where a sensitivity of the image capturing unit is increased from an initial sensitivity to a maximum sensitivity while calculating the exposure time for obtaining a suitable brightness at the maximum sensitivity;

setting the sensitivity of the image capturing unit back to the initial sensitivity after setting the exposure time in the image capturing unit; and wherein the calculating of the exposure time comprises calculating an intermediate exposure time on the basis of a ratio of brightness of the digital data, which is captured at the maximum sensitivity, to a suitable brightness until a brightness obtained on the basis of the digital data reaches the suitable brightness while calculating the exposure time, and adjust the intermediate exposure time using an exposure time correction coefficient which is determined from the maximum sensitivity and the initial sensitivity.

14. The automatic exposure method according to claim 13, wherein the exposure time is obtained by using, for the intermediate exposure time when the exposure time is obtained, a ratio of a sensitivity before being changed to the high sensitivity to a sensitivity after being changed.

* * * * *